(12) United States Patent
Takiyama

(10) Patent No.: US 8,305,611 B2
(45) Date of Patent: Nov. 6, 2012

(54) MULTIFUNCTION SYSTEM AND ITS MANUFACTURING METHOD

(75) Inventor: Yasuhiro Takiyama, Yokohama (JP)

(73) Assignee: Canon Kabushiki Kaisha (JP)

( * ) Notice: Subject to any disclaimer, the term of this patent is extended or adjusted under 35 U.S.C. 154(b) by 1093 days.

(21) Appl. No.: 12/207,489

(22) Filed: Sep. 9, 2008

(65) Prior Publication Data

US 2009/0067000 A1     Mar. 12, 2009

(30) Foreign Application Priority Data

Sep. 12, 2007  (JP) .................................. 2007-237263

(51) Int. Cl.
```
H04M 3/42      (2006.01)
G06Q 10/00     (2012.01)
G06F 17/00     (2006.01)
G06F 17/22     (2006.01)
H04N 1/00      (2006.01)
```
(52) U.S. Cl. ................. 358/1.15; 379/202.01; 705/7.19; 715/202; 715/211; 358/403

(58) Field of Classification Search ................. 358/1.15, 358/408; 379/202.01; 705/719; 715/202
See application file for complete search history.

(56) References Cited

U.S. PATENT DOCUMENTS

| | | | |
|---|---|---|---|
| 6,363,352 B1 * | 3/2002 | Dailey et al. | 705/7.19 |
| 7,516,410 B2 * | 4/2009 | Thompson et al. | 715/753 |
| 2006/0045253 A1 * | 3/2006 | Bieselin et al. | 379/202.01 |
| 2007/0100939 A1 * | 5/2007 | Bagley et al. | 709/204 |

FOREIGN PATENT DOCUMENTS

JP     2005-301895 A     10/2005

* cited by examiner

Primary Examiner — Akwasi M Sarpong
(74) Attorney, Agent, or Firm — Rossi, Kimms & McDowell LLP

(57) ABSTRACT

The present invention provides a multifunction system and a control method thereof which enables output of conference materials of appropriate content at an appropriate timing and in an appropriate location, without making the conference organizer worry about the needs and rank of conference attendees. To accomplish this, the multifunction system of the present invention comprises a server which manages attribute information of members, a server which manages reservation information of conferences, and a print server which manages output of conference materials. The print server acquires attribute information corresponding to attendees of the conference included in the reservation information from the member management server, and outputs the conference material for each attendee based on the attribute information of each.

9 Claims, 19 Drawing Sheets

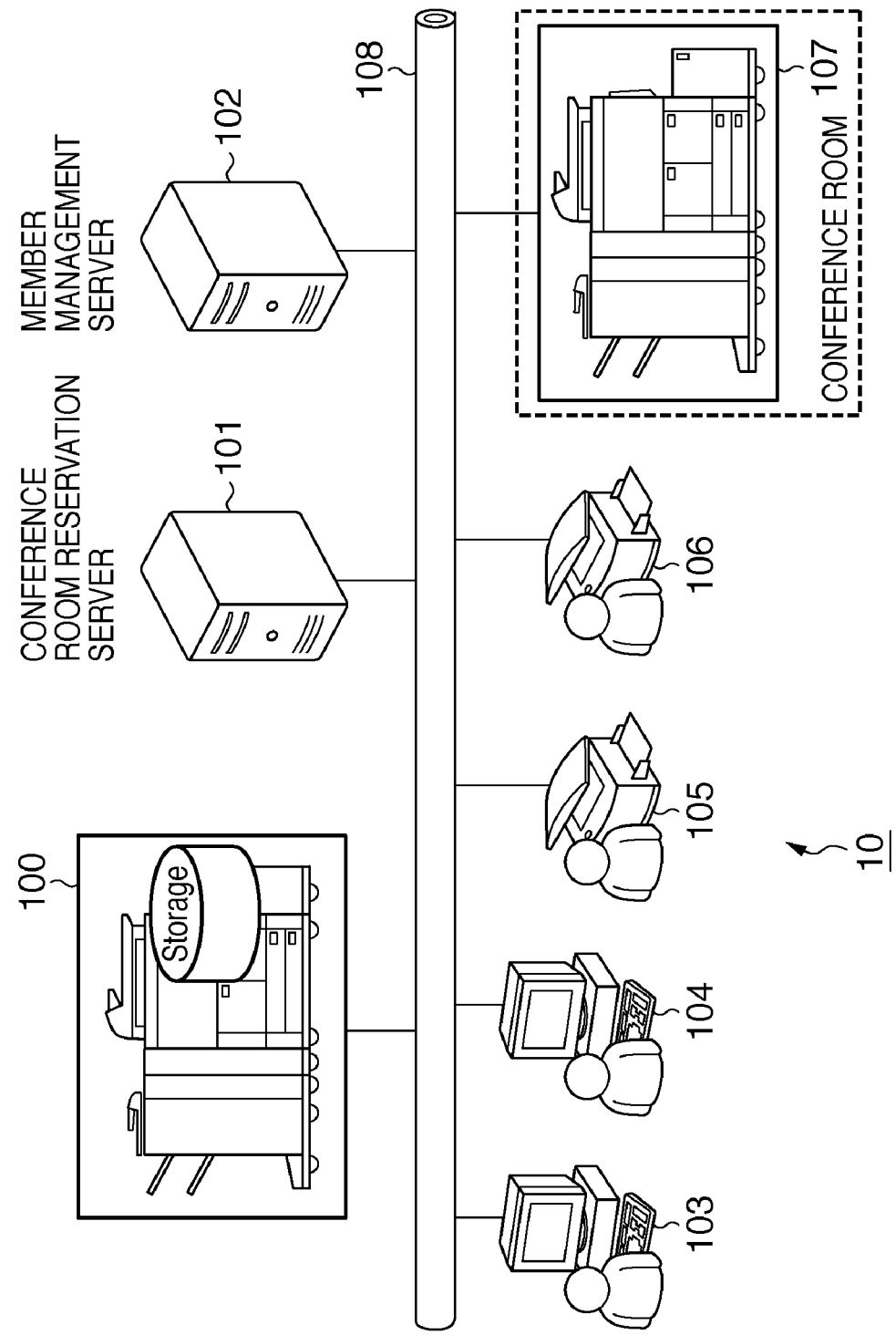

FIG. 4

☐ MEMBER REGISTRATION

○ BASIC INFORMATION

| | |
|---|---|
| NAME | YAMADA TARO |
| COMPANY | ABC INC. |
| AFFILIATION | FIRST DESIGN DIVISION 11TH ROOM |
| RANK | DEPARTMENT CHIEF |
| E-MAIL ADDRESS | yamada.taro@abc.com |
| PERSONAL PRINTER | 172.xx.xx.35 |

[MODIFY ADDRESS] 401
[MODIFY PRINTER] 402

○ OUTPUT DEVICE SETTING

TRANSMISSION DESTINATION OF DOCUMENT

| | | |
|---|---|---|
| E-MAIL ADDRESS | yamada.taro@abc.com | ○ |
| PERSONAL PRINTER | 172.xx.xx.36 | ○ |
| NOT SPECIFIED | | ⦿ |

403

○ OUTPUT TIMING SETTING

TRANSMISSION TIMING OF DOCUMENT

| | |
|---|---|
| IMMEDIATE | ○ |
| CONFERENCE DAY | ⦿ |
| NOT SPECIFIED | ○ |

404

[REGISTER] 405

FIG. 5

| 501 | 502 | 503 | 504 | 505 | |
|---|---|---|---|---|---|
| ID | NAME | RANK | OUTPUT DESTINATION | OUTPUT TIMING | |
| 0000 | SUZUKI YASUHIRO | FIRST DESIGN DEPT. Level 4 (DIV. CHIEF) | 172.xx.xx.35 | IMMEDIATE | ... |
| 0001 | YAMADA TARO | 11TH DESIGN ROOM Level 3 (DEP. CHIEF) | NOT SPECIFIED | CONFERENCE DAY | ... |
| 0002 | KATO ICHIRO | 12TH DESIGN ROOM Level 3 (DEP. CHIEF) | Kato@xxx.co.jp | IMMEDIATE | ... |
| 0003 | SATO JIRO | 11TH DESIGN ROOM Level 2 (SENIOR STAFF) | 172.xx.xx.37 | CONFERENCE DAY | ... |
| 0004 | ITO KENJI | 12TH DESIGN ROOM Level 2 (SENIOR STAFF) | 172.xx.xx.38 | CONFERENCE DAY | ... |
| 0005 | YAMASHITA AKIRA | 11TH DESIGN ROOM Level 1 (GENERAL) | NOT SPECIFIED | CONFERENCE DAY | ... |
| 0006 | SAKATA OSAMU | 11TH DESIGN ROOM Level 1 (GENERAL) | NOT SPECIFIED | NOT SPECIFIED | ... |
| ... | ... | ... | ... | ... | ... |

500

F I G. 6

| | | | |
|---|---|---|---|
| ☐ CONFERENCE RESERVATION INFORMATION | | | |
| ☐ DATE | JAN xx, 2007 (MON) | MODIFY | ~601 |
| ☐ TIME | 10:00 - 12:00 | MODIFY | ~602 |
| ☐ CONFERENCE ROOM | 1ST CONFERENCE ROOM | MODIFY | ~603 |
| ☐ NAME OF ORGANIZER | SATO JIRO | | |
| ☐ AFFILIATION OF ORGANIZER | 11TH DESIGN ROOM | | |
| ☐ RESERVATION CONTENT | DEVELOPMENT EVALUATION | MODIFY | ~604 |
| ☐ ATTENDEE | 10 | REGISTER / ADD | ~605 |
| ☐ CONFERENCE MATERIAL | 2 REGISTERED | REGISTER / ADD | ~606 |
| | | OK | ~607 |

600

901
903

902

F I G. 11

| CONFERENCE ROOM 1101 | DATE 1102 | TIME 1103 | LOCATION 1104 | PRINTER 1105 | ATTENDEE 1106 | CONFERENCE MATERIAL 1107 |
|---|---|---|---|---|---|---|
| ROOM A | 2006.11.xx | 13:00 - 15:00 | FIRST CONFERENCE ROOM | 172.xx.xx.52 | ID0000, 0001... | 0x0000xxxx |
| ROOM B | 2006.11.xx | 13:00 - 15:00 | SECOND CONFERENCE ROOM | 172.xx.xx.48 | ... | ... |
| ROOM C | 2006.11.xx | 15:00 - 17:00 | FIRST CONFERENCE ROOM | 172.xx.xx.52 | ... | ... |
| ROOM D | 2006.11.xx | 13:00 - 15:00 | FIRST CONFERENCE ROOM | 172.xx.xx.52 | ... | ... |
| ... | ... | ... | ... | ... | ... | ... |

| 1301 | 1302 | 1303 | 1304 | 1305 | 1306 |
|---|---|---|---|---|---|
| OUTPUT DESTINATION | OUTPUT DESTINATION ATTRIBUTE | NAME | LEVEL | # OF COPIES | OUTPUT STATUS |
| 172.xx.xx.35 | Local | SUZUKI YASUHIRO | LEVEL 4 | 1 | INCOMPLETE |
| Kato@xxx.co.jp | Local | KATO ICHIRO | LEVEL 3 | 1 | INCOMPLETE |
| ... | ... | ... | ... | ... | ... |
| ... | ... | ... | ... | ... | ... |

1300

F I G. 14

| 1301 OUTPUT DESTINATION | 1302 OUTPUT DESTINATION ATTRIBUTE | 1303 NAME | 1304 LEVEL | 1305 # OF COPIES | 1306 OUTPUT STATUS |
|---|---|---|---|---|---|
| 172.xx.xx.37 | Local | SATO JIRO | LEVEL 2 | 1 | INCOMPLETE |
| 172.xx.xx.38 | Local | ITO KENJI | LEVEL 2 | 1 | INCOMPLETE |
| ... | ... | ... | ... | ... | ... |
| ... | ... | ... | ... | ... | ... |

| OUTPUT DESTINATION 1301 | OUTPUT DESTINATION ATTRIBUTE 1302 | CONFERENCE ROOM 1501 | LEVEL 1304 | # OF COPIES 1305 | OUTPUT STATUS 1306 |
|---|---|---|---|---|---|
| 172.xx.xx.52 | Public | FIRST CONFERENCE ROOM | LEVEL 1 | 4 | INCOMPLETE |

1500

MULTIFUNCTION SYSTEM AND ITS MANUFACTURING METHOD

BACKGROUND OF THE INVENTION

1. Field of the Invention

The present invention relates to a multifunction system and its control method for outputting materials used in a conference based on conference reservation information.

2. Description of the Related Art

As a method of distributing materials to be used in a conference, a method of physically distributing materials printed ahead of time by the conference organizer at the time of conference is known. Further, a method of sending electronic files of materials via E-mail to attendees, and have the attendees print them out prior to the conference is known.

Further, in Japanese Patent Laid-open No. 2005-301895, a system which performs on-line reservation of a conference room via a network using a terminal such as a PC is presented. In this system, output of the material is performed at the time of the conference in the output apparatus located within the conference room based on the reservation information of the conference room.

However, these conventional technologies have the following problems. For example, in the method where the conference organizer prints out the material ahead of time, when a large number of copies needs to be prepared, the burden on the conference organizer becomes extremely heavy. Further, among the attendees there may be individuals wishing to check the material prior to the conference, and it was difficult to address these types of request. Other methods, such as distributing the material in electronic form through an E-mail or a shared folder and have each attendee print out the material, is also available. However, this method is useful for checking the material prior to the conference, but does not allow the conference organizer to check whether the attendees have printed out the material prior to the conference, which ultimately necessitates the organizer to prepare the material. Further, in the system disclosed in Japanese Patent Laid-open No. 2005-301895, although it is possible to print out the material using the output apparatus within the conference room in accordance with the reserved conference time, it is not possible to check the material prior to the conference.

Further, when there are confidential matters within the distributed material, a situation may arise in which the material cannot be distributed to all attendees. In such a case, the conference organizer was required to go through a burdensome task of checking the rank of the attendees, and distributing the material according to their ranks.

SUMMARY OF THE INVENTION

The present invention enables realization of a multifunction system and a control method thereof which outputs conference materials having appropriate content at an appropriate time & location, without having to worry about requests or ranks of the conference attendees.

One aspect of the present invention provides a multifunction system comprising a member management server which manages attribute information of members, a conference room reservation server which manages reservation information of conferences room, a plurality of image printing apparatuses which prints conference materials to be used in a reserved conference, a plurality of information processing apparatuses which performs reservation of conferences, and a print server which manages output of the conference materials to the image printing apparatuses or the information processing apparatuses, each of the apparatuses being connected via a network, wherein: the member management server comprises, a first transmission unit adapted to transmit information of a member registration screen for registering members, which is to be displayed on a display apparatus provided in the information processing apparatus, to the information processing apparatus via the network upon receiving a request for registration or modification of a member from the information processing device, and an attribute information storage unit adapted to acquire from the information processing apparatus and store the attribute information including at least identification information, member access level, output destination information of the conference material, and output timing of the conference material for each member registered through the member registration screen; the conference room reservation server comprises, a second transmission unit adapted to transmit information of a conference registration screen for registering a conference, to be displayed on a display apparatus provided in the information processing apparatus, to the information processing apparatus via the network upon receiving a request for registration or modification of a conference from the information processing apparatus, a reservation information storage unit adapted to acquire from the information processing apparatus and store reservation information including at least time and date of conference, the identification information of attendees, conference material data, and access level of conference data, and a third transmission unit adapted to transmit the acquired reservation information to the print server via the network; and the print server comprises, a reception unit adapted to receive the reservation information transmitted from the conference room reservation server, a material data storage unit adapted to store data of the conference material included in the received reservation information, an acquiring unit adapted to acquire the attribute information of members corresponding to the identification information of the attendees from the member management server via the network, using the identification information of attendees included in the reservation information as a search keyword, a material selection unit adapted to select conference material to be printed for each attendee, by comparing the member access level included in the acquired attribute information and the conference material access level, and an output unit adapted to read out the selected conference material data from the material data storage unit and output the conference material to an apparatus indicated by the output destination of the conference material at a time indicated by the output timing of the conference material.

Another aspect of the present invention provides a control method of a multifunction system comprising a member management server which manages attribute information of members, a conference room reservation server which manages reservation information of conferences room, a plurality of image printing apparatuses which prints conference materials to be used in a reserved conference, a plurality of information processing apparatuses which performs reservation of conferences, and a print server which manages output of the conference materials to the image printing apparatuses or the information processing apparatuses, each of the apparatuses being connected via a network, wherein: the member management server performs the steps of, transmitting information of a member registration screen for registering members, which is to be displayed on a display apparatus provided in the information processing apparatus, to the information processing apparatus via the network upon receiving a request for registration or modification of a member from the information processing device, and acquiring, from the information processing apparatus, and storing the attribute information including at least identification information, member access level, output destination information of the conference material, and output timing of the conference material for each member registered through the member registration screen; the conference room reservation server performs the steps of, transmitting information of a conference registration screen for registering a conference, to be displayed on a display apparatus provided in the information processing apparatus, to the information processing apparatus via the network upon receiving a request for registration or modification of a conference from the information processing apparatus, acquiring, from the information processing apparatus, and storing reservation information including at least time and date of conference, the identification information of attendees, conference material data, and access level of conference data, and transmitting the acquired reservation information to the print server via the network; and the print server performs the steps of, receiving the reservation information transmitted from the conference room reservation server, storing data of the conference material included in the received reservation information, acquiring the attribute information of members corresponding to the identification information of the attendees from the member management server via the network, using the identification information of attendees included in the reservation information as a search keyword, selecting conference material to be printed for each attendee, by comparing the member access level included in the acquired attribute information and the conference material access level, and reading out the selected conference material data from the material data storage unit and outputting the conference material to an apparatus indicated by the output destination of the conference material at a time indicated by the output timing of the conference material.

Still another aspect of the present invention provides a multifunction system which manages output timing of conference material, comprising: a first management unit adapted to manage reservation information of conferences including at least information indicating attendees of the conference, a storage unit adapted to store data of the conference material to be used in the conference indicated by the managed reservation information of conference, a second management unit adapted to manage output timing information indicating output timing of conference material data to be used in the conference of interest to each of the attendees of the conference, and an output unit adapted to output conference material data stored in the storage unit based on the conference reservation information and the output timing information.

Yet another aspect of the present invention provides a control method of a multifunction system which manages output timing of conference material, comprising steps of: managing reservation information of conferences including at least information indicating attendees of the conference, storing data of the conference material to be used in the conference indicated by the managed reservation information of conference, managing output timing information indicating output timing of conference material data to be used in the conference of interest to each of the attendees of the conference, and outputting conference material data stored in the storage unit based on the conference reservation information and the output timing information.

Further features of the present invention will be apparent from the following description of exemplary embodiments with reference to the attached drawings.

BRIEF DESCRIPTION OF THE DRAWINGS

FIG. 1 is a diagram showing an exemplary structure of a multifunction system 10 according to a first embodiment.

FIG. 4 is a diagram showing a registration screen 400 which registers attributes of members managed by a member management server 102 according to the first embodiment.

FIG. 5 is a diagram showing a member management table 500 in which attribute information of members managed at the member management server 102 is set according to the first embodiment.

FIG. 6 is a diagram showing a registration screen 600 when registering reservation information of conferences managed by a conference room reservation management server 101 according to the first embodiment.

FIG. 11 is a diagram showing a conference management table 1100 according to the first embodiment.

FIG. 13 is a diagram showing an immediate output list 1300 according to the first embodiment.

FIG. 14 is a diagram showing the conference current day output list 1400 according to the first embodiment.

FIG. 15 is a diagram showing a conference room output list 1500 according to the first embodiment.

DESCRIPTION OF THE EMBODIMENTS

Figure 2A:
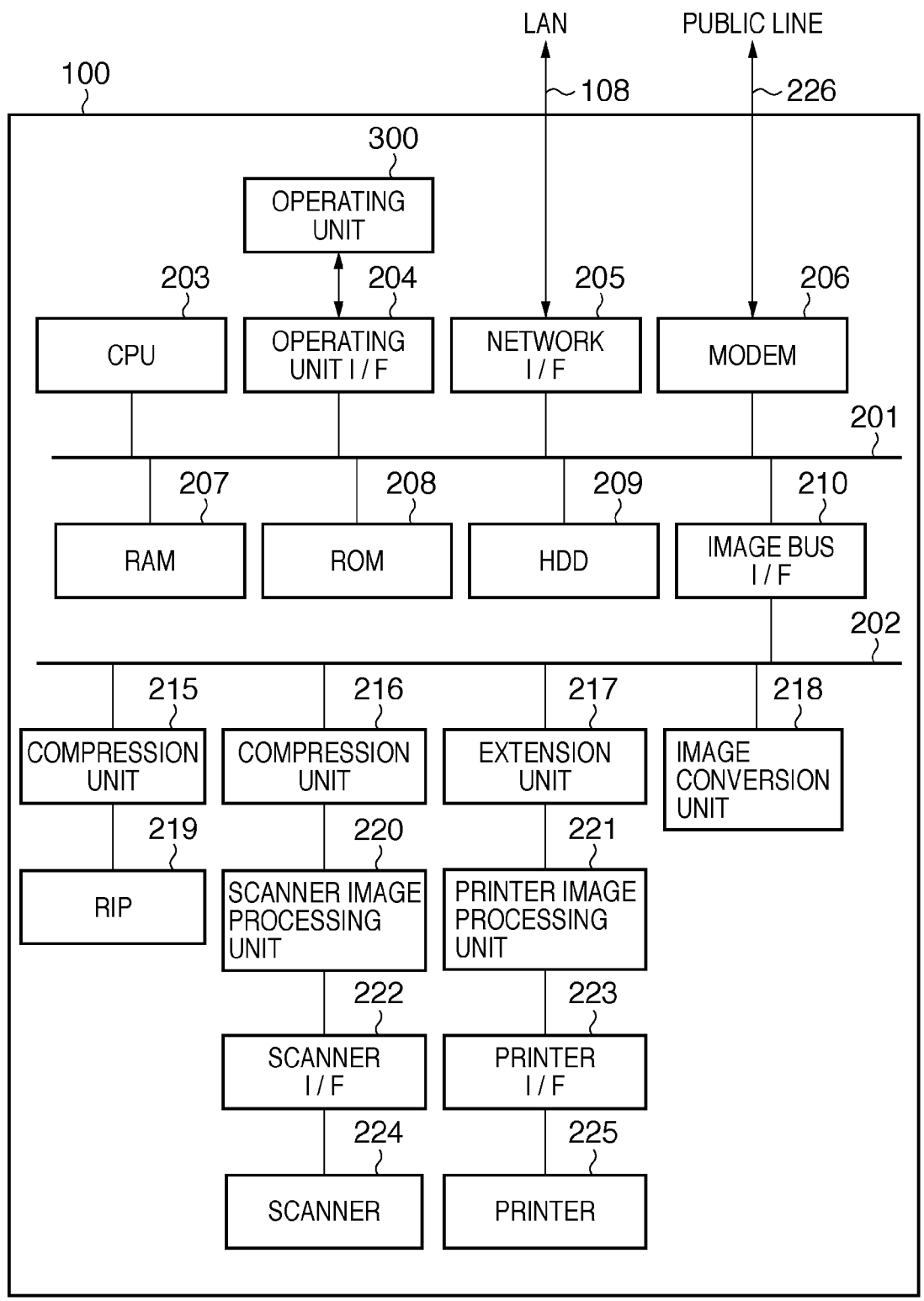
FIG. 2A is a diagram showing the structure of a printing server 100 according to the first embodiment.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<System Structure>
From hereon, with reference to FIG. 1 to 16, a first embodiment will be explained. FIG. 1 is a diagram showing an exemplary structure of a multifunction system 10 according to the first embodiment.

The multifunction system 10 comprises a print server 100, a conference room reservation server 101, a member management server 102, personal computers (PC) 103 and 104, personal printers 105 and 106, and a conference room printer 107. The apparatuses are each connected to a network 108 via a LAN, etc. The print server 100, the personal printers 105 and 106 and the conference room printer 107 function as image printing apparatuses which print the conference materials on recording paper.

In the present embodiment, the print server 100 is a digital multi-function peripheral having a print function, a scan function and a copy function. Of course, the print server 100 can be implemented with an information processing apparatus such as a PC. The print server 100 acquires information from the conference room reservation server 101 and the member management server 102, and outputs conference materials with appropriate content at an appropriate time.

The conference room reservation server 101 manages reception of conference reservation, as well as storing the reservation information of conference room. The reservation information includes, for example, name of the conference room, time and date, attendees, and information of distributed material. The member management server 102 stores attribute information of inputted members, and receives addition, deletion and attribute correction of members. Attribute information includes information such as names of members, ID, access levels and output destination information. The conference room reservation server 101 and member management server 102 can be realized with an information processing apparatus such as a PC equipped with a memory domain. Details regarding conference reservation information and member attribute information will be explained later. Accordingly, the conference room reservation server 101 functions as a first management unit. Further, the member management server 102 functions as a second and third management units.

PCs 103 and 104 are used by the users utilizing the present system, and perform registration of conference information and member information via the network 108. Further, they can be selected as the output destination of the conference material from the print server 100. In such a case, the print server 100 sends electronic files of the conference material to the mail addresses registered in the member management server 102.

The personal printers 105 and 106 indicate, for example, printers that are located next to the users' desks. These personal printers 105 and 106, if registered as output destination printers in attribute information, are selected as output destinations of conference material from the print server 100. The conference printer 107 can be used as an output apparatus placed in a conference room.

Although only one conference room is provided in the present embodiment, it is needless to say that the present invention can be implemented in a situation where a plurality of conference rooms exist and an output device is placed in each. Further, the present invention can also be implemented in a structure having a larger number of PCs and personal printers. In the multifunction system 10 of the present invention, it is possible to distribute appropriate conference materials in a place and time desired by each attendee, by working in conjunction with the conference reservation made by the user.

<Structure of Print Server>
Next, with reference to FIGS. 2A and 2B, the structure of a digital multifunctional apparatus which is the print server 100 of the present invention will be explained. FIG. 2A is a diagram showing the structure of a printing server 100 according to the first embodiment.

The print server 100 comprises a scanner 224 which is an image input device, and a printer 225 which is an image output device, and performs input/output of image information and device information by connecting to the network (LAN) 108 and a public line 226. Further, the print server 100 comprises a CPU 203, an operating unit I/F 204, a network I/F 205, a modem 206, a RAM 207, a ROM 208, a HDD 209 and an image BUS I/F 210. These structural components are distributed on the system BUS 201, and are connected via other structural components, image BUS I/F 210 and image BUS 202. Further, the print server 100 comprises compression units 215 and 216, an extension unit 217, an image conversion unit 218, a RIP 219, a scanner image processing unit 220, a printer image processing unit 221, a scanner I/F 222 and a printer I/F 223. These structural components are distributed on the image BUS 202.

The CPU 203 functions as a controller which controls the entire digital multi-function peripheral, and further manages output of conference material as a print server. The structure for managing output of the conference material will be explained in a later section with reference to FIG. 2B.

The RAM 207 is a system work memory for the CPU 203 to function, and is also utilized as an image memory for temporary storage of image data. The ROM 208 is used as a boot ROM, and stores a boot program for the digital multi-functional apparatus. The HDD 209 is a hard disc drive which stores system software, image data, etc. This HDD 209 can also store information regarding nodes connected to the network 108 such as image output speed and location for each address.

The operating unit I/F 204 is an interface unit of the operating unit 300, outputs image data to be displayed to the operating unit 300. Further, it conveys information inputted by the user at the operating unit 300 to the CPU 203. The network I/F 205 is connected to the network 108, and performs input/output of information. The modem 206 is connected to the public line 226 and performs modulation/demodulation processes for data transmission.

The image BUS I/F 210 is a BUS bridge which connects the system BUS 201 and the image BUS 202 which forwards image data at a high speed, and converts data structure.

Raster image processor (RIP) 219 deploy a PDL code to a bitmap image. The scanner I/F 222 and the printer I/F 223 connect the scanner 224 and printer 225 which are image output devices. The scanner image processing unit 220 corrects, modifies, and edits the image data acquired from the scanner 224 through the scanner I/F 222.

The compression unit 215 and 216 acquires image data and compresses the acquired image data. The extension unit 217 sends the extended image data to the printer image processing unit 221. The printer image processing unit 221 acquires the image data sent from the extension unit 217, and executes image processing of the image data according to the image region data granted to this image data. The image data following image processing is outputted to the printer 225 via the printer I/F 223. The image conversion unit 218 executes a certain conversion process on the image data. Details of the process performed at the image conversion unit 218 will be omitted.

Figure 2B:
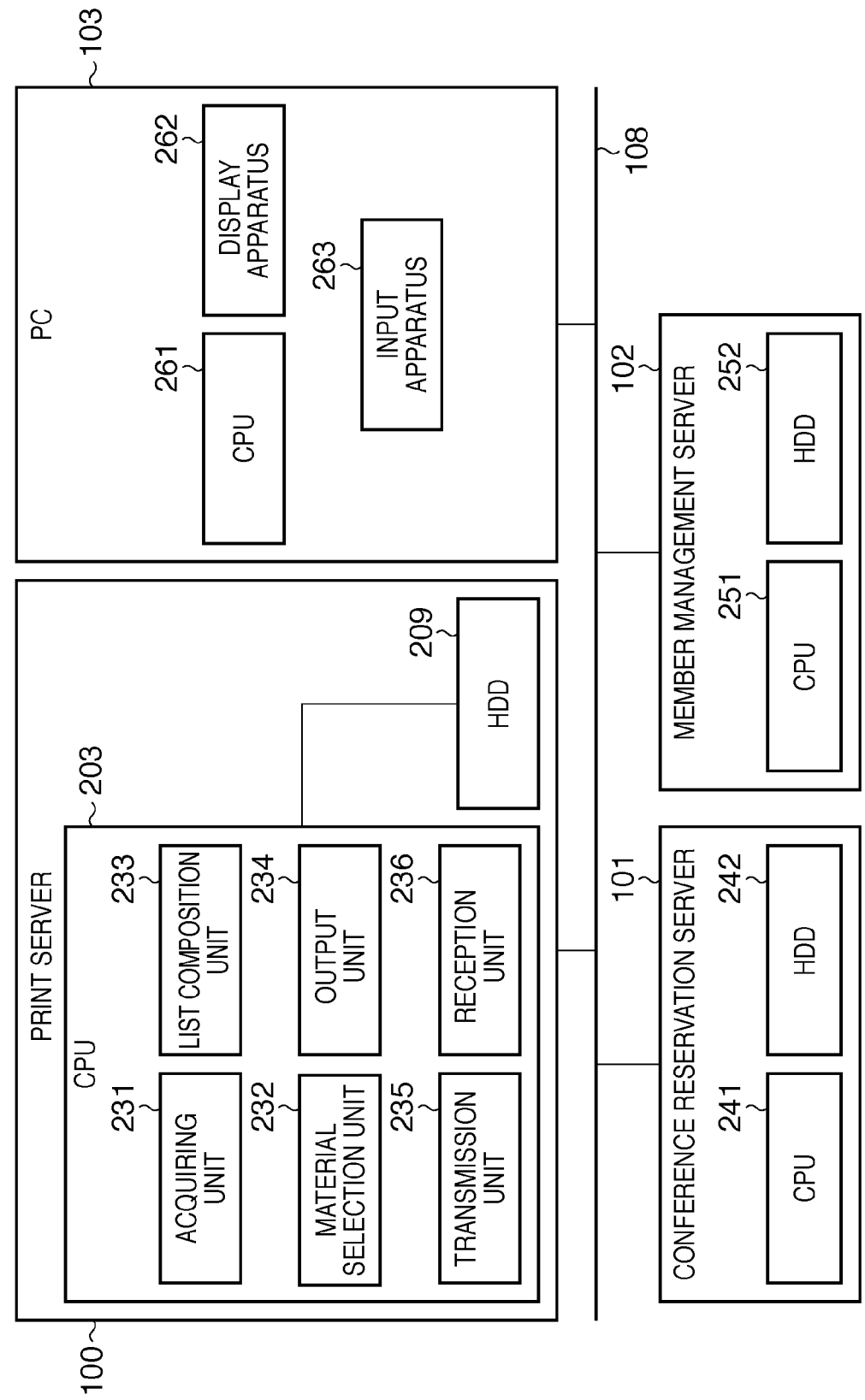
FIG. 2B is a diagram showing the control structure of each of the apparatuses included in the multifunction system 10 according to the first embodiment.

FIG. 2B is a diagram showing the control structure of each of the apparatuses included in the multifunction system 10 according to the first embodiment. This Fig. is simplified in order to explain mainly the control block according to the present invention. Therefore, each device can be structured to include other control blocks.

The PC 103 comprises a CPU 261, a display apparatus 262 and an input apparatus 263. The PC 103 is used by the user to perform reservation registration or modification of a conference, and to perform registration or modification of members. For example, when registering reservation of a conference, the CPU 261 requests registration of a conference to the conference room reservation server 101 via the network 108, based on the information inputted through the input apparatus 263 by the user. When the registration of a conference is requested, the data of a registration screen for conference registration is sent out from the conference room reservation server 101 via the network 108. When the data of the registration screen is received, the CPU 261 displays the registration screen on its own display apparatus 262. The user at this point inputs registration of a conference through this registration screen. When the reservation information, which is the registration of the conference, is inputted, the PC 103 transmits the reservation information to the conference room reservation server 101 via the network 108. Further, when registering or modifying members, the PC 103 performs, for the member management server 102, the same operation that is performed for registration or modification of a conference.

The member management server 102 comprises a CPU 251 and a HDD 252. The HDD 252 functions as an attribute information storage unit, and stores information including at least identification information (ID) of members, access level of members, output destination information of the conference materials, and the output time of the conference material. Details of the attribute information will be explained in a later section with reference to FIGS. 4 and 5. The overall management of the HDD 252 which stores this attribute information is handled by the CPU 251, which performs registration of new members, modification of already registered attribute information and provision of member information requested by other apparatuses (for example, the print server 100). Further, the CPU 251, upon receiving requests of member registration/modification from the PC 103, transmits information of member registration screen to be displayed on the display apparatus 262 for registration of members to the PC 103 via the network 108. In this case, the CPU 251 functions as a first transmission unit.

The conference room reservation server 101 comprises a CPU 241 and a HDD 242. The HDD 242 functions as a reservation information storage unit, and stores reservation information including time and date of the conference, identification information of the attendees, conference material data, and conference material access level. Details of the reservation information will be provided in a later section with reference to FIG. 6 to 9B. The overall management of the HDD 242 is handled by the CPU 241, which performs registration of new conferences, modification of reservation information of already registered conferences, and provision of reservation information requested by other apparatuses (for example print server 100). Further, the CPU 241 transmits information of conference registration screen to be displayed on the display apparatus 262 for registration of conference reservation to the PC 103 via the network 108. In this case, the CPU 241 functions as a second transmission unit. Further, the CPU 241, upon receiving reservation information from the PC 103, transmits the acquired reservation information to the print server 100 via the network 108. The CPU 241 in this case functions as a third transmission unit.

The print server 100 comprises, as mentioned above, a CPU 203 and a HDD 209. Other structural components shown in FIG. 2A are omitted for the sake of convenience. The CPU 203 comprises an acquiring unit 231, a material selection unit 232, a list composition unit 233, output unit 234, a transmission unit 235, and a reception unit 236.

The reception unit 236 functions as a reception unit, and receives reservation information transmitted from the conference room reservation server 101. When the reservation information is received, the CPU 203 stores the data of conference material included in the received reservation information in the HDD 209 which functions as a storage unit. The acquiring unit 231 functions as an acquiring unit, and acquires attribute information of members corresponding to the identification information corresponding to the attendees from the member management server 102 via the network 108, using the identification information of the attendees included in the reservation information as a search keyword. Specifically, the acquiring unit 231 transmits the identification information of the attendee to the member management server 102, and then acquires the attribute information as a response thereof. The member management server 102 reads out the attribute information corresponding to the search keyword from HDD 252 using the transmitted identification information as the search keyword, and transmits the attribute information to the print server 100.

The material selection unit 232 functions as a material selection unit, makes comparisons of the access levels of members included in the obtained attribute information and the access levels of the conference materials included in the reservation information, and selects the conference material to be printed for each of the attendees. In other words, it determines the browsable conference material for each attendee. Detailed explanations will be provided later.

The list composition unit 233 functions as a list composition unit, and composes an output which classifies lists for each output timing. Further, this output list composes lists, each including at least output destination of the conference material for members attending the conference, access levels of members, number of copies of the conference material to be outputted, and information regarding output status indicating whether output has completed or not. The output timing of the conference material are classified into a first division which is immediately outputted when an output list is composed, a second division which is outputted on the day of the conference, and a third division which is outputted by image printing apparatuses placed in the reserved conference room at the start time of the conference. From hereon, the first division of output list will be referred to as an immediate output list, the second division as the conference current day output list, and the third division as the conference room output list.

The output unit 234 functions as an output unit, which reads out the selected conference material data from the HDD 209 and outputs the data to the apparatus indicated by the output destination of the conference material at a time indicated by the output timing of the conference material.

<Control Unit>

Figure 3:
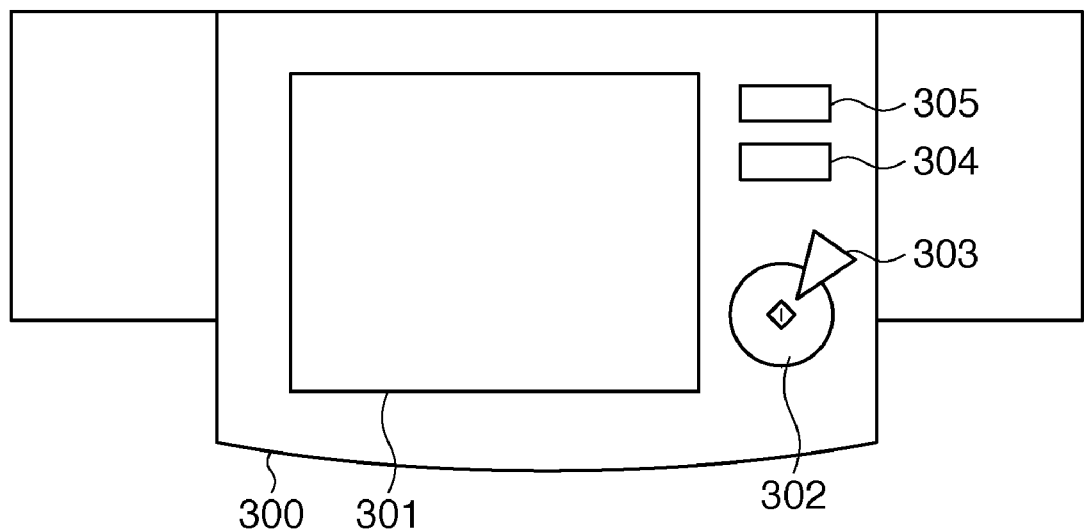
FIG. 3 is a diagram showing an exemplary structure of an operating unit 300.

Next, with reference to FIG. 3, the structure of the operating unit 300 will be explained. FIG. 3 is a diagram showing an exemplary structure of the operating unit 300. The operating unit 300 indicates an LCD operation panel 301, a start key 302, a stop key 303, a reset key 304 and a power supply key 305.

The LCD operation panel 301 is a combination of an LCD and a touch panel, on which contents of setting and software keys are displayed. The start key 302 is a hardware key which initiates operations such as copying. For example, green and red LEDs are incorporated into the start key 302, and flashes green light when ready and red light when not ready. The stop key 303 is a hardware key used for stopping operation. 304 is a hardware reset key, for initializing the digital multi-function peripheral (print server 100). The power supply key 305 is a hardware key for performing ON/OFF of power supply of the digital multi-function peripheral.

<Attribute Information of Members>

Next, with reference to FIG. 4 to 5, attribute information of members and its registration will be explained. FIG. 4 is a diagram showing a registration screen 400 which registers attributes of members managed by a member management server 102 according to the first embodiment. Registration of attribute information is, for example, performed at the PC 103 shown in FIG. 1 via a web browser, etc. The registration screen 400 is transmitted as an HTML file from the member management server 102 to the PC 103 via the network 108 at a stage where the PC 103 has made an access to the member management server 102, and is displayed on the display apparatus of the PC 103. Further, according to the present embodiment, it is possible to set basic information, output device and output timing on the registration screen 400.

The registration screen 400 is structured such that information such as name, company, department, and rank can be set as the basic information. Further, it is also possible to register email address and personal printer information, which can be modified by pressing modification buttons 401 and 402.

In the setting of the output device, the transmission destination of documents, which the user utilizes as the output destination of remote copying and such, are set. In the present embodiment, it is possible to specify email addresses or personal printers owned by the users as the output destination, and they are selected using a radio button 403. Further, when there is no particular specification, "not specified" is selected.

The setting of the output timing designates the timing of transmission when other users transmit documents using remote copying and such. In this case it is possible to select "immediate", "conference day" or "not specified", and is selected by the user using the radio button 404.

Normally, these member registrations can only be registered or modified by the user him/herself or his/her superiors. These attribute information of the members are sent to the member management server 102 via the network 108 when the register button 405 is pressed.

FIG. 5 is a diagram showing a member management table 500 in which attribute information of members managed at the member management server 102 is set according to the first embodiment. As shown in the member management table 500 of FIG. 5, the member management server 102 manages attribute information of each member. Accordingly, the print server 100 can acquire attribute information of the attendees from the member management server 102 using the ID 501 of members who will be attending the conference.

The member management table 500 includes for each of the members at least the information of ID 501, name 502, rank 503, output destination 504 and output timing 505. The ID 501 is an identifier for identifying each member, and functions as a search keyword when obtaining attribute information of a certain member. The name 502 and the rank 503 are set from the basic information indicated in FIG. 4. The output destination 504 is set from the output device setting information shown in FIG. 4, and indicates the output destination of the conference material. The output timing 505 is set from the output timing setting information shown in FIG. 4, and indicates the output timing of the conference material. Further, the rank 503 is represented by the access level, and is used for specifying access restriction to documents, etc. In reality, for the rank 503 and the output timing 505, numerical values indicating the corresponding access level and output level are set in the member management table 500. Also, the name 502 and the output destination 504 are set information of character string.

<Reservation Information of the Conference>

With reference to FIG. 6 to 9B, reservation information of the conference and the registration thereof will be explained. FIG. 6 is a diagram showing a registration screen 600 when registering reservation information of conferences managed by a conference room reservation management server 101 according to the first embodiment. Registration of reservation information is, for example, performed at the PC 103 of FIG. 1 via a web browser, etc. The registration screen 600 is transmitted as an HTML file from the conference room reservation server 101 to the PC 103 via the network 108 at a stage where the PC 103 has made an access to the conference room reservation server 101, and is displayed on the display apparatus of the PC 103.

According to the present embodiment, the registration screen 600 is structured such that date, time, conference room, name of the person making the reservation, affiliation of the person making the reservation, attendees, and conference materials can be set. Date and time indicate the date and time at which the reserved conference will take place. Name of the person making the reservation and affiliation of the person making the reservation indicate the name and affiliation of the user who has accessed the conference room reservation server 101 via the PC 103. The information regarding these name and affiliation of the person making the reservation may be displayed at a time point when the registration screen 600 including the corresponding name and affiliation from the computer name of the PC 103 are displayed. In this case, it is required that the server managing the computer name, the name of the person making the reservation and the affiliation be connected within the multifunction system 10. Alternatively, the above information is managed by the conference room reservation server 101. The attendees indicate the attendees that will participate in the conference. The conference material indicates the material to be used during the reserved conference.

Further, each of the items on the registration screen 600 includes modify buttons 601 to 604 as well as register/add buttons 605 and 606. The modify button 601 is used to modify the date. The modify button 602 is used to modify the time. The modify button 603 is used to modify the conference room. The modify button 604 is used to modify the content of reservation. The register/add button 605 is used to register or add attendees who will be attending the reserved conference. When the register/add button 605 is pressed, the display switches to the attendee selection screen shown in FIG. 7. The register/add button 606 is used to register or add conference materials. When the register/add button 606 is pressed, the display switches to the conference material registration screen shown in FIG. 8.

Figure 7:
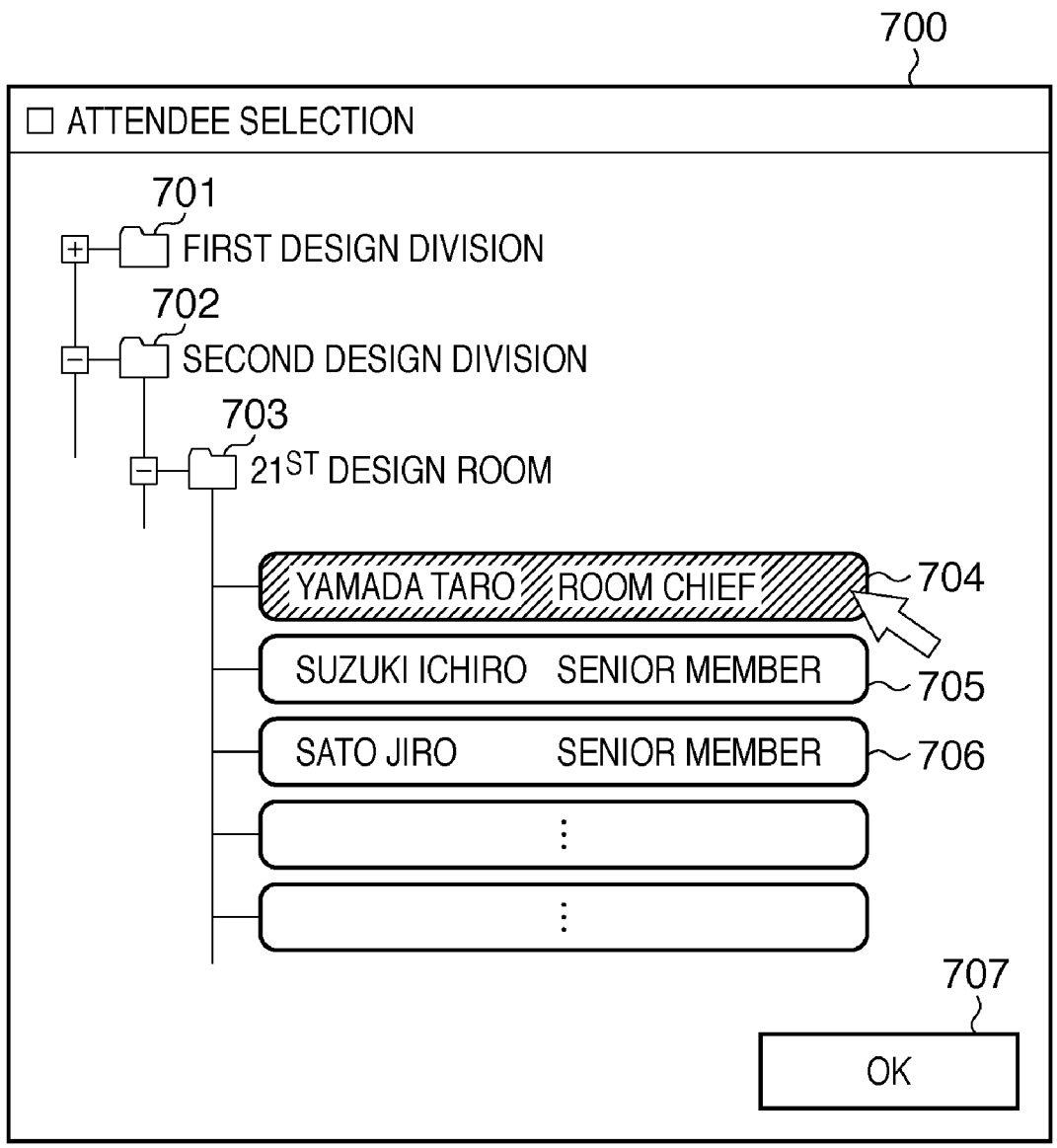
FIG. 7 is a diagram showing a selection screen 700 for selecting attendees of a conference according to the first embodiment.

FIG. 7 is a diagram showing a selection screen 700 for selecting attendees of a conference according to the first embodiment. When the register/add button 605 shown in FIG. 6 is pressed, the selection screen 700 is displayed on the display apparatus of the PC 103. Specifically, when the register/add button 605 is pressed, information indicating that the register/add button 605 is pressed is notified to the conference room reservation server 101 from the PC 103, for example. When the conference room reservation server 101 receives this notification, data to generate the selection screen 700, such as data in HTML format, is transmitted to the PC

103. The PC 103 displays the content on its own display apparatus in accordance with the transmitted HTML data.

The selection screen 700, as indicated in FIG. 7, is stratified by each affiliation type and displayed. In 701 and 702, folders are shown in units of one division. When the folders 701 or 702 are pressed, a folder 703 is displayed in units of one room. Further, when the folder 703 is pressed, as shown in FIG. 7 for example, names of members 704 to 706 who are affiliated with the 21$^{st}$ design room are displayed.

It is possible to register the attendees using the units of a division, a room or an individual at the selection screen 700. When registering attendees by the division, all members affiliated to the division will become attendees of the conference being registered, which can be done by, for example, selecting the folder 701 or 702. Further, when registering attendees by the room, all members affiliated to the room will become attendees of the conference being registered, which can be done by, for example, selecting the folder 703. Further, when individual attendees are to be registered, the names 704, 705, and 706 are selected, for example. When all attendees are selected, the OK button 707 is pressed. When the OK button 707 is pressed, the registration screen 600 shown in FIG. 6 is displayed once again. At this point, the number of registered attendees is calculated and is displayed in the attendee item.

Figure 8:
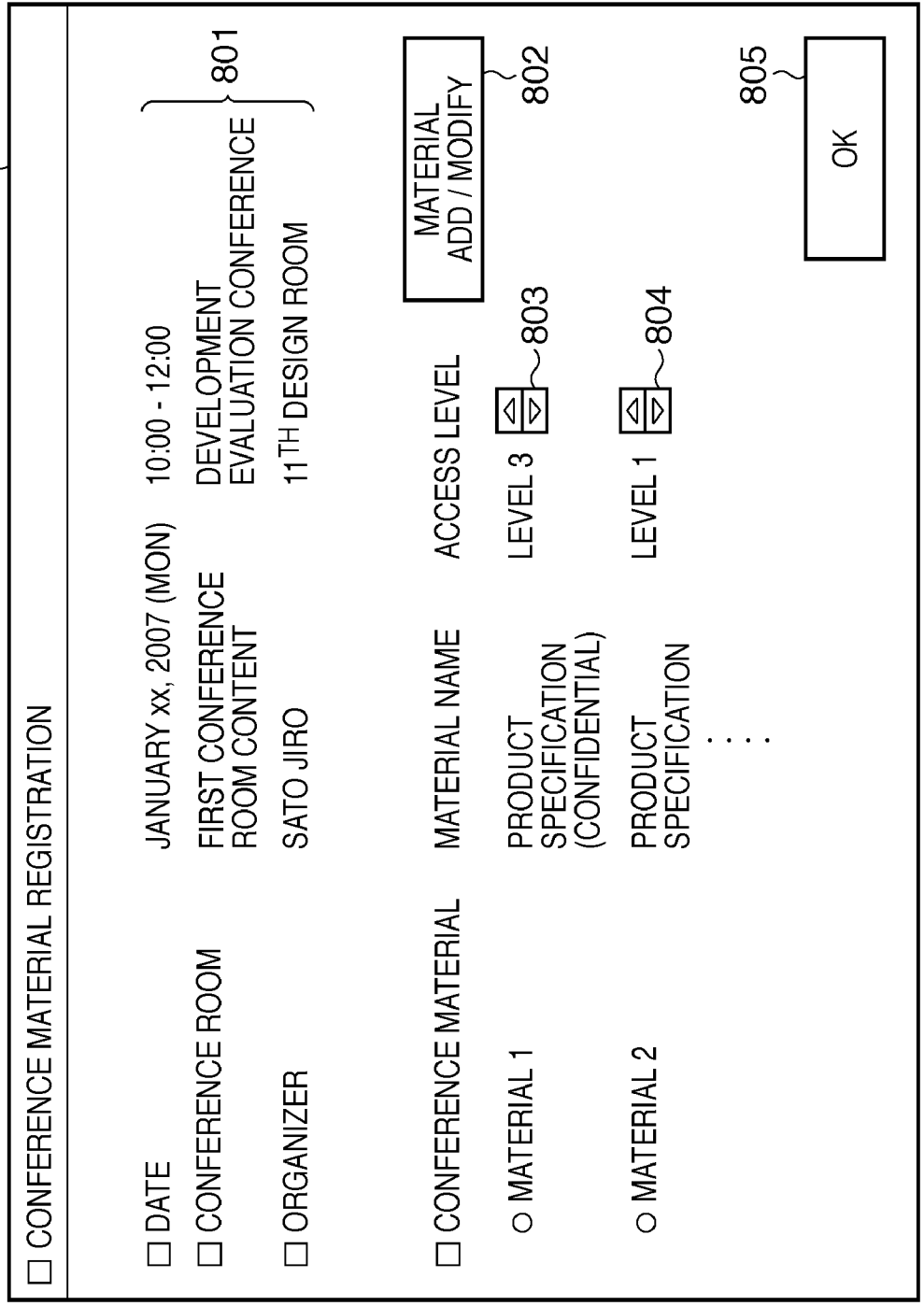
FIG. 8 is a diagram showing a registration screen 800 for registering conference material according to the first embodiment.

FIG. 8 is a diagram showing a registration screen 800 for registering conference material according to the first embodiment. The registration screen 800 is displayed on the display apparatus of the PC 103 when the register/add button 606 shown in FIG. 6 is pressed. Specifically, when the register/add button 606 is pressed, information indicating that the register/add button 606 is pressed is notified to the conference room reservation server 101 from the PC 103, for example. When the conference room reservation server 101 receives this notification, data to generate the registration screen 800, such as data in HTML format, is transmitted to the PC 103. The PC 103 displays the content on its own display apparatus in accordance with the transmitted HTML data.

The registration screen 800 includes basic information 801 which indicates basic information of the conference and material information indicating the material for the registered conference. Further, the registration screen 800 includes an add/modify button 802 for adding or modifying the conference material, spin buttons 803 and 804 displayed for each registered material, and an OK button 805 for registering the inputted conference materials.

Information, such as the time of conference, conference room, content of the conference and the name affiliation of the person making the reservation, is included in the basic information 801. In the registration screen 800, which is initially displayed, does not include the material information. When the add/modify button 802 is pressed, an input screen (not shown) is displayed, through which addition of conference materials can be made. Then, the material information is displayed. The spin buttons 803 and 804 are for setting the access levels of the added materials. The access level used herein refers to information which restricts members that can browse the material. For example, in the registration screen 800, material 1 can only be browsed by members having access levels of 3 or higher. Therefore, members having access level 1 and 2 cannot browse material 1. On the other hand, the access level of material 2 is 1, and can be browsed by all members. In other words, the bigger the numerical value of the access level, the higher the confidentiality of the material.

Figure 9A:
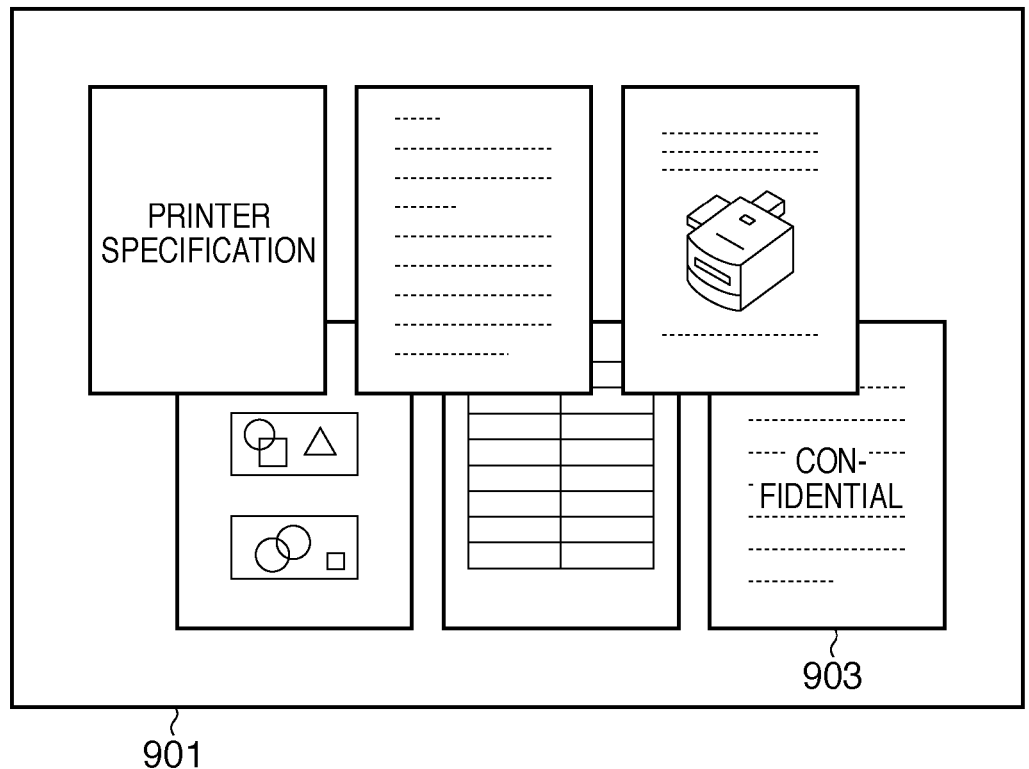
FIGS. 9 A and B are diagrams explaining the conference material according to the first embodiment.
Figure 9B:
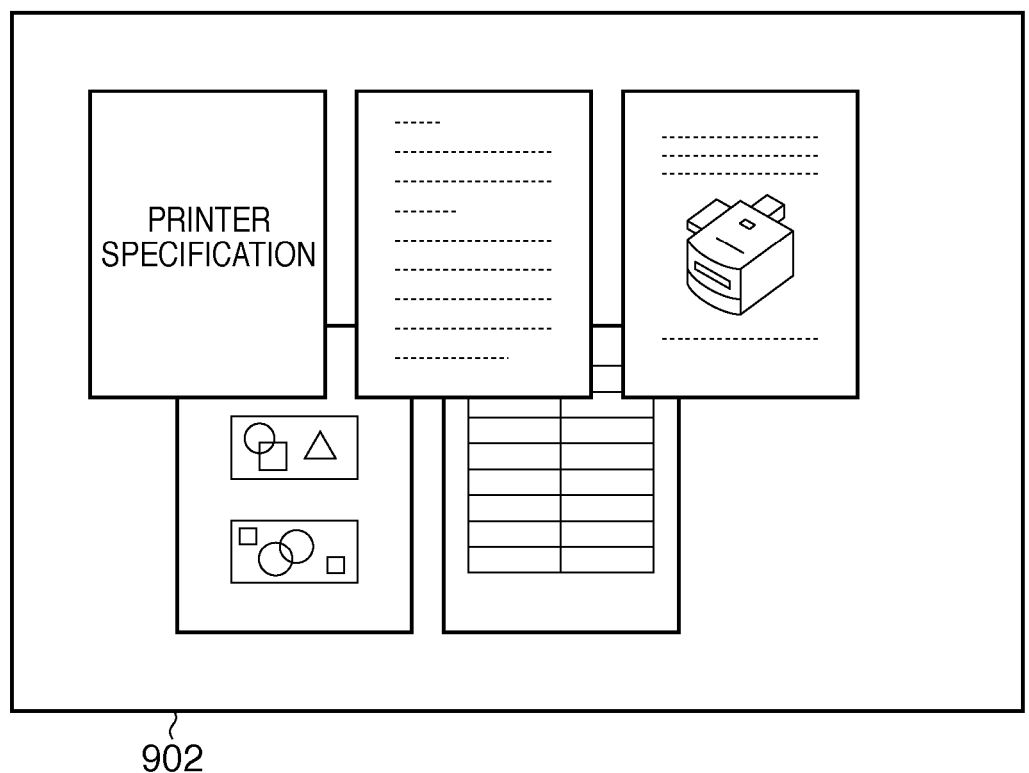

FIGS. 9A and 9B are diagrams explaining the conference material according to the first embodiment. These figures indicate, as the materials of FIG. 8, those that are distributed to members with access levels of 3 or higher, and those that are distributed to members with access levels of 2 or lower. A conference material 901 indicates the material distributed to members with access levels of 3 or higher. A conference material 902 indicates the material distributed to members with access levels of 2 or lower. As shown in FIG. 9A, a conference material 903, which can be accessed with an access level of 3 or higher, is included in the conference material 901. Further, as shown in FIG. 9B, the conference material 902 does not include any materials which is accessed with access levels of 3 or higher.

Figure 10:
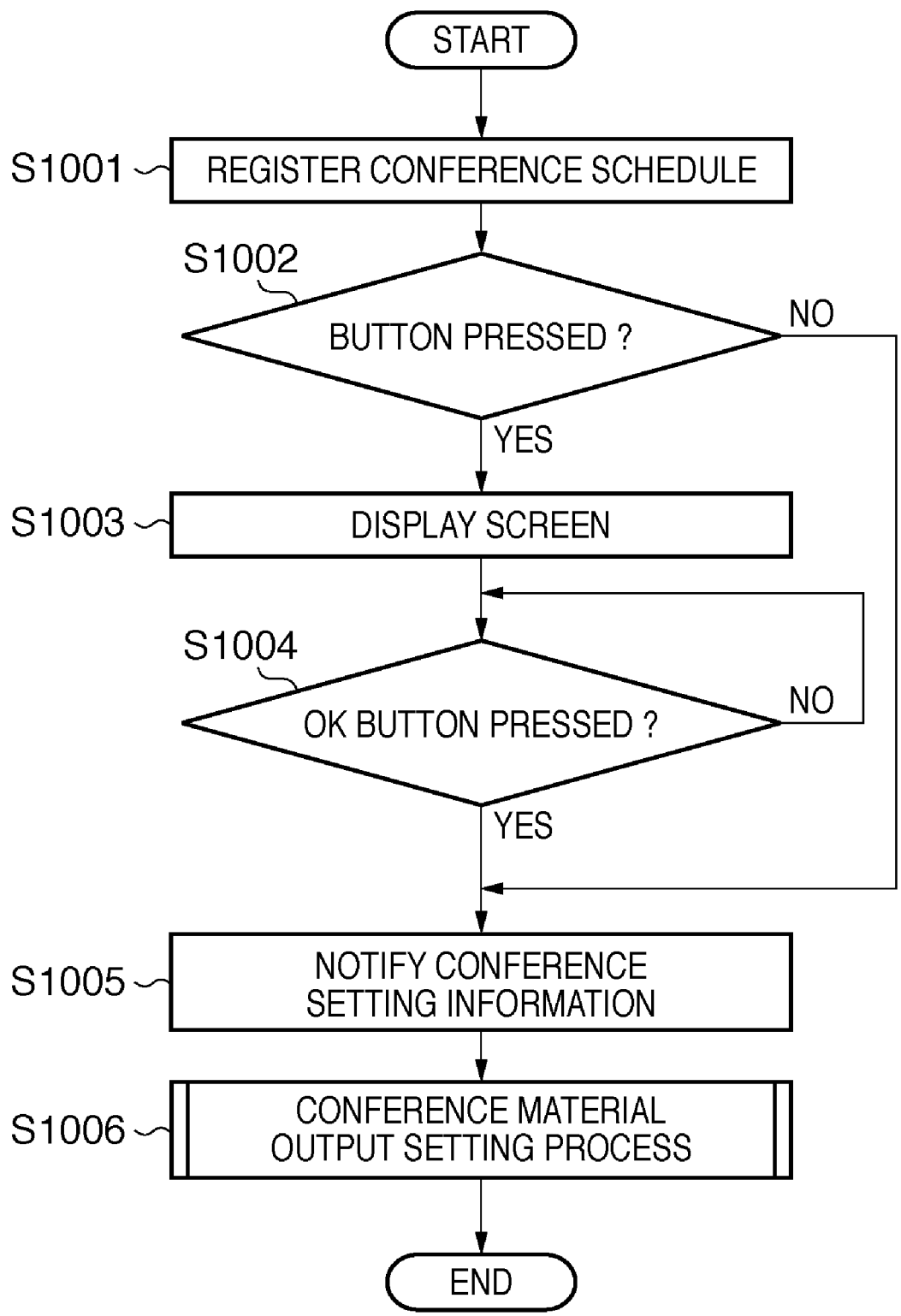
FIG. 10 is a flowchart showing the processing order when registering reservation information according to the first embodiment.

Next, with reference to FIG. 10, the process flow when registering reservation information of a conference will be explained. FIG. 10 is a flowchart showing the processing order when registering reservation information according to the first embodiment. The process of conference reservation shown below is controlled by the CPU 241 included in the conference room reservation server 101 and the CPU 261 included in the PC 103.

At step S1001, when a request of conference reservation or modification is notified from the PC 103 to the conference room reservation server 101, the CPU 241 first functions as the second transmission unit and transmits registration information 600 for performing reservation of a conference to the PC 103 via the network 108. Upon receiving the information of the registration screen 400, the CPU 261 displays the registration screen 600 on the display apparatus 262. At this step, information such as time of conference, content, attendees are inputted via the input apparatus (keyboard, mouse, etc.) 263 of the PC 103.

Next, at step S1002, the CPU 261 determines whether register/add button 605 or the register/add button 606 of the registration screen 600 is pressed. If pressed, the process moves onto step S1003. If not, the process moves onto step S1005.

At step S1003, the CPU 261 displays a selection screen 700 when the registration/add button 605 is pressed, and displays a registration screen 800 when the registration/add button 606 is pressed. At this step, it is also possible to set links on the register/add buttons 605 and 606, and have the selections screen 700 and the registration screen 800 automatically displayed when the corresponding buttons are pressed. In such a case, at S1001, the CPU 241 transmits the information of the selection screen 700 and the registration screen 800 in addition to the registration screen 600. Subsequently, at step S1004, the CPU 261 periodically determines whether the OK button of the displayed screen (in this case, OK button 707 or OK button 805) until it is actually pressed.

When the OK button is pressed, at step S1005, the CPU 261 transmits the reservation information of the set conference via the network 108 to the conference room reservation server 101. The CPU 241, upon receiving the reservation information, adds the reservation information to the conference management table stored in the HDD 242. Further, a notification for the completion of reservation is transmitted to the user's specified E-mail address in order to notify the user registering the conference of the reception of the conference reservation. The content of the notification for the completion of reservation is attached with an outline of the conference and a URL for reconfiguration. The user can bring up the registration screen 600 using this URL, and perform modification of conference information and update of the conference material.

At the end, at step S1006, if the conference material is attached to the reservation information, the CPU 261 performs output setting of the conference material by notifying the print server 100 with the reservation information. Further, the CPU 261 functions as the third transmission unit and transmits the material data via the network 108. At the print server 100, the transmitted conference material data is accumulated in the HDD 209. Subsequently, in regard to the output setting process of the conference material executed by the CPU 203 will be explained in detail with reference to FIG. 12.

The conference management table 1100 accumulated in the HDD 242 of the conference room reservation server 101 at S1005 will be explained. FIG. 11 is a diagram showing a conference management table 1100 according to the first embodiment.

The conference management table 1100 comprises a conference name 1101, a conference date 1102, a conference time 1103, a conference location 1104, a printer 1105, attendees 1106 and a conference material 1107. These pieces of information are accumulated for each conference reservation information. Note that in order to improve memory efficiency of the HDD 242, it is also possible to have the reservation information automatically deleted when the conference time 1103 has passed. Further, as the actual conference location 1104 data being accumulated, it is desirable that the data be a predetermined ID of conference rooms instead of names of conference rooms. It is indicated in the printer 1105 the printer address of the printer which is installed in the conference room in which the conference will be held. The attendees 1106 are registered with IDs of all attendees. The conference material 1107 is registered with the ID of the conference material. The actual data of the conference material is, as mentioned above, stored in the HDD 209 of the print server 100. As shown in FIG. 11, it is also possible to register the address of the HDD 209, which stores the conference material data, in this domain of the conference material 1107.

Figure 12:
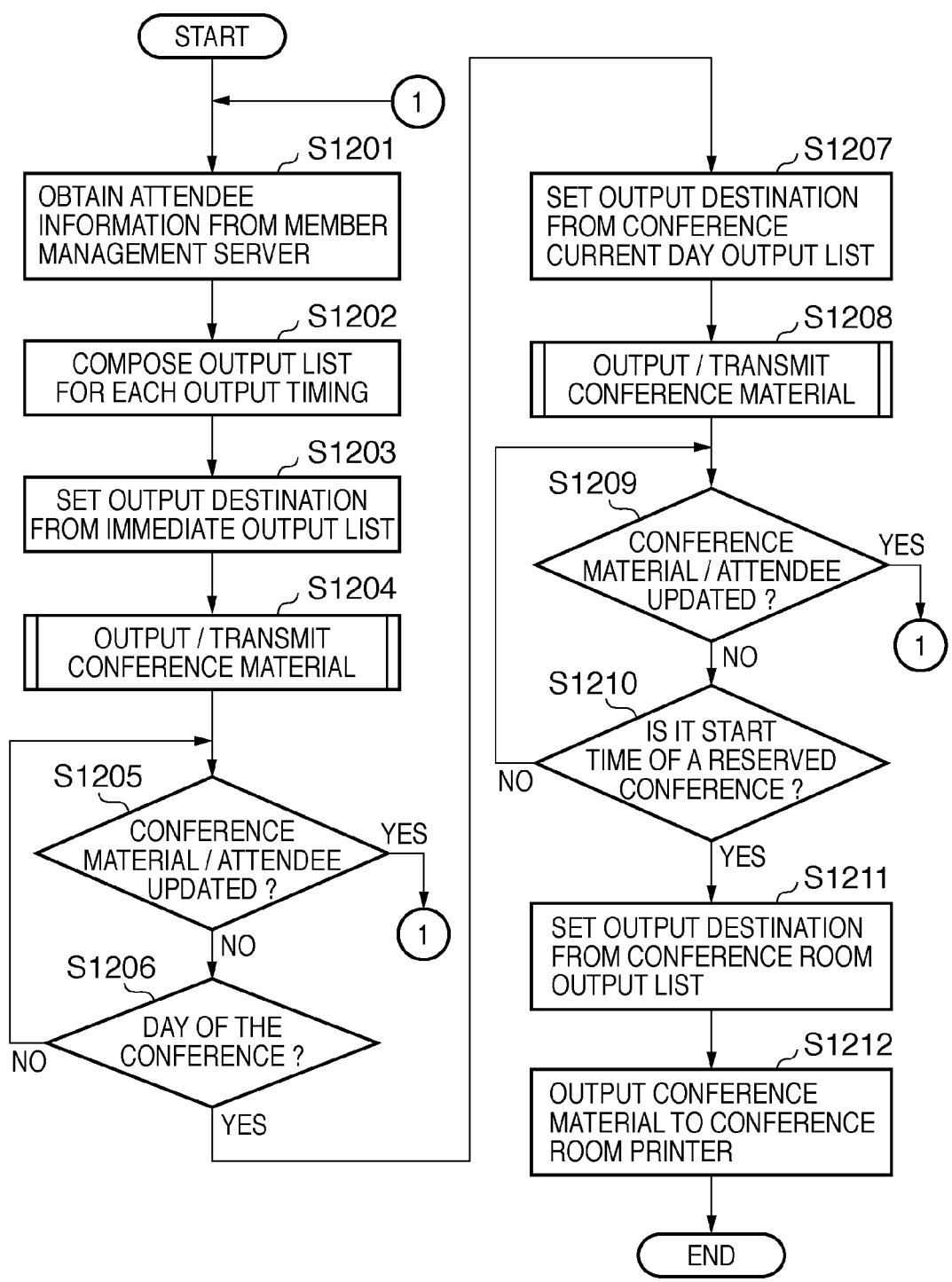
FIG. 12 is a flowchart showing the processing order of output setting process of the conference material according to the first embodiment.

<Output Setting of the Conference Material>
Next, with reference to FIG. 12 to 16, the output setting process of the conference material will be explained. FIG. 12 is a flowchart showing the processing order of output setting process of the conference material according to the first embodiment. The output setting process of the conference material used in this section indicates a process of setting information which indicates which material is to be output at what time via which apparatus for each attendee, for the conference material registered in the reservation information. The overall control of the process shown below is performed by the CPU 203 of the print server 100.

At step S1201, the acquiring unit 231 acquires attribute information of each individual attendee included in the registration information notified at S1006 from the member management server 102. In particular, the acquiring unit 231 notifies the member management server 102 of all IDs of the attendees set in the reservation information. The CPU 251 of the member management server 102 uses the notified ID as a search keyword, and reads out the corresponding attribute information from the HDD 252. Further, the CPU 251 acquires the rank (=access level) 503, the output destination 504, and the output timing 505 of the member management table 500 shown in FIG. 5. Further, the CPU 251 obtains information from all attendees, and transmits the information to the print server 100 via the network 108.

At step S1202, the list composition unit 233 composes an output list for each output timing based on the output timing 505 among the acquired information. The output list for each output timing will be explained herewith reference to FIG. 13 to 15. FIG. 13 is a diagram showing an immediate output list 1300 according to the first embodiment. FIG. 14 is a diagram showing the conference current day output list 1400 according to the first embodiment. FIG. 15 is a diagram showing a conference room output list 1500 according to the first embodiment.

The immediate output list 1300 and the conference current day output list 1400 each include information regarding an output destination of the attendee 1301, an output destination attribute information 1302, a name 1303, an access level 1304, a copy number 1305, and output status 1306. The output destination 1301 sets the address of the output destination, for example an IP address in the case of a printer, or an E-mail address in the case of a PC. The output destination attribute information 1302 sets information indicating whether the output destination device is public or private. The name 1303 sets the character string of the attendee's name. The name 1303 can also set the ID of the attendee. The access level 1304 sets the access level of the material which the corresponding attendee can browse. The copy number 1305 sets the number of copies of the material to be outputted. The output status 1306 sets a flag indicating whether the output of the material has completed or not. When composing the list, a numerical value indicating all materials yet to be output (for example, 0) is set. On the other hand, when the output is completed, for example a value of 1 is set.

In the conference room output list 1500, the immediate output list 1300 and the conference current day output list 1400 are compared, and the information of the conference room 1501 is set instead of the name 1303. The conference room 1501 sets the name of the conference room in which the conference takes place. Further, it is also possible to set an ID which identify the conference room in the conference room 1501. As discussed, since the output destination of the conference room output list 1500 is public, it is unnecessary to manage detailed information for each attendee, and is managed for the total number of attendees as a whole. Accordingly, the number of attendees registered in the conference room output list 1500 will be reflected in the number of copies to be output.

In the following, the method of composing each list will be explained. In the immediate output list 1300, the attendee information for which the output timing 505 of the attribute information is set as "immediate" is compiled. Further, only those attendee information which have the output destination 504 set as either a "PC" or a "personal printer" are compiled. Accordingly, even if the output timing 505 is set as "immediate", if the output destination 504 of the attendee information is set as "not specified", it will not be included in the immediate output list. This compilation method is effective for improving security.

The conference current day output list 1400 compiles only those attendee information which has the output timing 505 set as the "conference day", and also has the output destination 504 set as a "PC" or a "personal printer". Accordingly, like the instant output list 1300, even if the output timing 505 is set as "immediate", if the output destination 504 of the attendee information is set as "not specified", it will not be included in the conference current day output list.

The conference room output list 1500 compiles the attendee information which does not fall into the immediate output list 1300 or the conference current day output list 1400. First, the CPU 203 composes the immediate output list 1300, and subsequently composes the conference current day output list 1400. Accordingly, the conference room output list 1500 compiles only the attendee information which is included neither in the immediate output list 1300 nor the conference current day output list 1400.

We will return to the explanation of FIG. 12. At step S1203, the CPU 203 performs output setting of the conference material from the immediate output list 1300. Specifically, the CPU 203 obtains the conference material to be output and the information of output destination for each of the registered attendees in the immediate output list 1300.

Subsequently, at step S1204, the output unit 234 performs output and transmission of the conference material. For example, in regard to the attendee "Suzuki Yasuhiro" indicated in FIG. 13, the output unit 234 transmits the electronic files of materials 1 and 2 shown in FIG. 8 by mail to the address of the output destination 1301. Further, in regard to the attendee "Kato Ichiro", the output unit 234 transmits materials 1 and 2 to the address of the personal printer set at the output destination 1301, and requests printing. Details of the process at step S1204 will be explained later with reference to FIG. 16.

Next, at step 1205, the CPU 203 inquires to the conference room reservation server 101 whether the information regarding the conference material and the attendee has been updated or not. When there are updates, the updated reservation information is acquired from the conference room reservation server 101, and re-executes the processing from S1201. On the other hand, when there have been no updates, at step S1206, the CPU 203 will determine whether the reserved conference is to be held on the current day. At this point it is also possible to determine whether the conference is to be held on the current day by referring to the calendar function of the print server 100. Further, CPU 203 may generate the current day output list 1400 and calculate the time current day output list to the current day. In this case, if the calculated the time is passed, the CPU 203 may determine that the current day is the conference day.

When the current day is determined to be the conference day, the process moves to step S1207. On the other hand, if it is not the day of the conference, the process returns to S1205. The process of S1205 repeated in consideration of the possibility of modifying of adding attendees and materials prior to the conference. This determination loop is repeated at fixed intervals. If this determination is performed too frequently, it will pose a large burden on the server. Therefore, it can be advantageous to have the interval length and the number of determination events configurable.

At step S1207, the CPU 203 performs output setting of the conference material from the conference current day output list 1400. More specifically, the CPU 203 acquires information regarding conference material to be output and the output destination for each of the attendees registered in the conference day list 1400.

Subsequently, at step S1208, the output unit 234 performs output and transmission of the conference material. For example, for the attendee "Sato Jiro" shown in FIG. 14, the output unit 234 transmits the electronic file of material 2 shown in FIG. 8 to the personal printer which is the output destination 1301, and requests printing. At this stage, since the access level 1304 of this particular attendee is 2, material 1 will not be browsable, and only material 2 is outputted. Details of the process at step S1208 will be explained later with reference to FIG. 16.

At step S1209, the CPU 203 inquires to the conference room reservation server 101 whether the information regarding the conference material and attendees has been updated. If it is updated, the updated reservation information is acquired from the conference room reservation server 101 and the process is repeated from step S1201. On the other hand, when it is not updated, the CPU 203 at step S1210 determines whether it is the time of the reserved conference.

If it is the time of the conference, the process moves onto step S1211. On the other hand, if it is not the time of the conference the process moves to step S1209. This takes into the consideration the possibility of modification and change of attendees and materials prior to the conference. Further, this determination loop is performed periodically at fixed intervals. If this determination is performed too frequently, it will pose a large burden on the server. Therefore, it can be advantageous to have the interval length and the number of determination loop configurable.

At step S1211, the CPU 203 performs output setting of the conference material from the conference room output list 1500. In particular, the CPU 203 acquires information regarding conference material to be outputted and the output destination for each of the attendees registered in the conference room output list 1500.

Subsequently, at step S1212, the output unit 234 performs output and transmission of the conference material. It is also possible to initiate the output prior to the conference start time in accordance to the volume of the material to be outputted in order to have output of the material completed at the start time of the conference. In such a case, in the process of the step S1210, it is necessary to set the time in consideration of the conference material output timing. Further, in such a case, because there is a possibility of other conferences taking place at the same time, it is preferable to have the material outputted into a box which is accessible only by the members who are attending the meeting. Because the conference material to be outputted in this case will be outputted at a conference room printer in a public location, only those with low confidentiality are outputted.

<Output Processing of the Conference Material>

Figure 16:
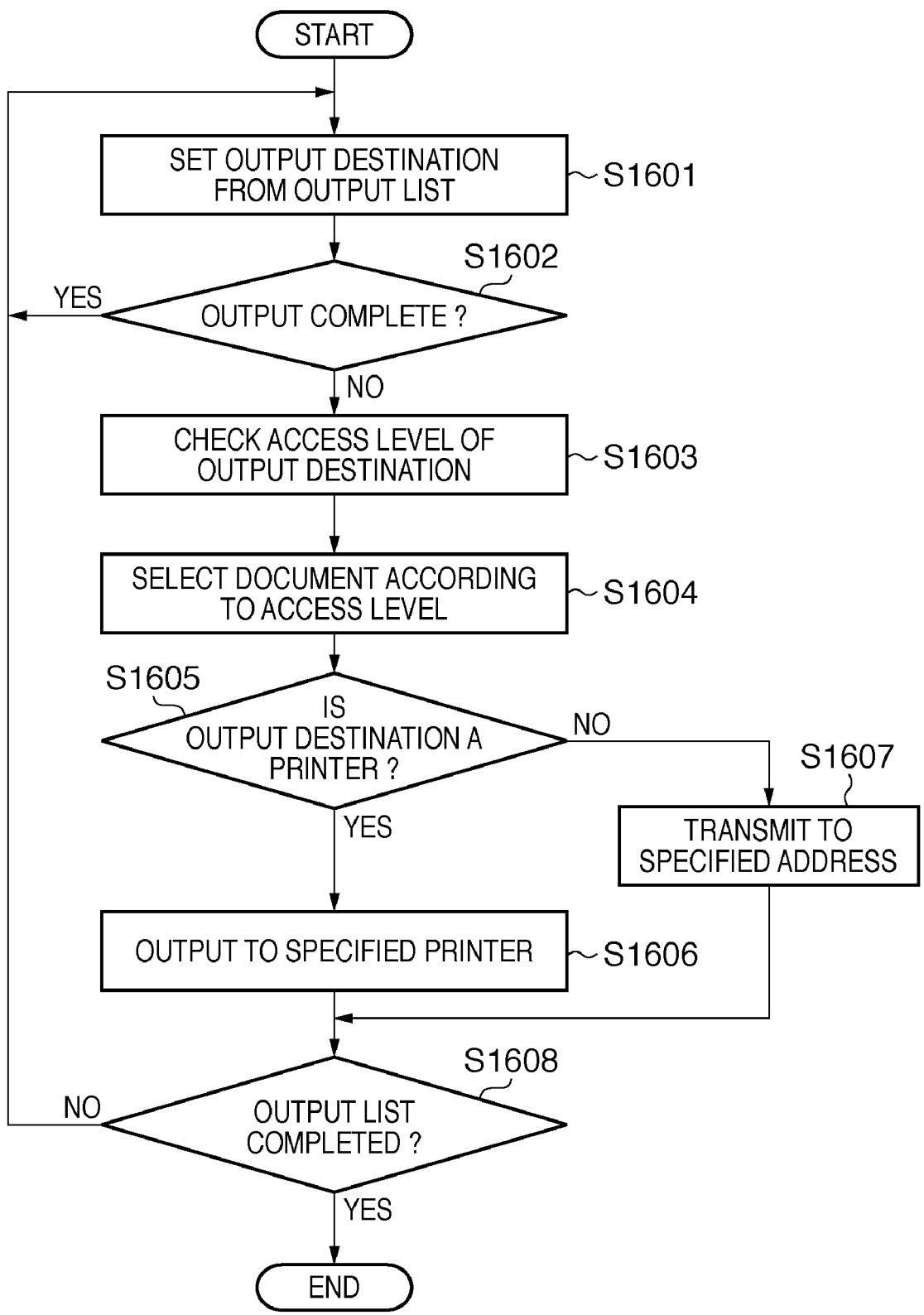
FIG. 16 is a flowchart showing the processing order of the output process of a print server 100 according to the first embodiment.

Next, with reference to FIG. 16, the output processing of the conference material according to the present invention will be explained. FIG. 16 is a flowchart showing the processing order of the output process of a print server 100 according to the first embodiment. The processes shown below indicate the details of the processes at S1204 and S1208. Accordingly, the output process shown here utilizes the immediate output list 1300 or the conference current day output list 1400. The output process will be explained below in which the instant output list 1300 shown FIG. 13 is utilized. Further, the overall control of the process shown here is performed by the CPU 203.

At step S1601, the CPU 203 initiates processing for each attendee from the output list configured in either S1203 or S1207, and acquires an output destination 1301.

Next, at step S1602, the CPU 203 determines whether the output of the material has been completed from the information of the output status 1306. When it is completed, the process returns to S1601, and initiates processing of the subsequent attendee. On the other hand, when the output of the material has not been completed, the CPU 203 at step S1603 acquires information of the access level 1304. Further, at step S1604, the material selection unit 232 selects browsable conference material according to the attendee access level 1304. For example, for the attendee "Suzuki Yasuhiro" shown in FIG. 13, materials 1 and 2 shown in FIG. 8 will be selected. In particular, a comparison is made between the access level of the attendee and the access level of the conference material, and the material will be determined as browsable when the access level of the attendee is equal to or higher than the access level of the conference material, which will subsequently be selected.

Next, at step S1605, the CPU 203 determines whether the output destination is a printer or a PC. In particular, the CPU 203 determines that the output destination is a printer when the output destination is an IP address, and a PC when the output destination is an E-mail address. When the destination is a printer, at step S1606 the output unit 234 transmits electronic data of the conference material to the output destination configured at S1601, and also notifies a print request at the same time. On the other hand, if the destination is a PC, at step S1607, the output unit 234 transmits an E-mail attached with the electronic data of the conference material to the output destination configured at S1601. It is also possible for the CPU 203 to have a function of converting the conference material to a specified electronic format, such as PDF format, and send it as an attachment. When the output of the conference material is completed at steps S1606 and S1607, a value of 1 indicating that the output is completed is set in the output status 1306 of the immediate output list 1300.

In the end, at step S1608, the CPU 203 determines whether the output by all attendees set in the immediate output list 1300 is completed. In particular, the CPU 203 determines whether a value of 1 indicating completion of output is set in the output status 1306. When not completed, the process moves onto S1601. On the other hand, when the process is incomplete, the output process is terminated.

As explained above, the multifunction system according to the present invention comprises a server managing the attribute information of members, a server which manages reservation information of conferences, and a print server which manages output of conference materials. The print server acquires attribute information corresponding to attendees of the conference included in the reservation information from the member management server, and outputs the conference material for each attendee based on the attribute information. With this, the print server takes into account the access levels of the conference material and the members, and is thus capable of appropriately distributing the material for each attendee. Therefore, the present multifunction system can avoid troublesome operations of the conference organizer checking the information of the attendees and distributing the conference material.

Note that the present invention is not limited to the above discussed embodiment and can be modified in various ways. For example, the print server composes output lists classified by each output timing of the conference material, such as an immediate output list, a conference current day output list, and a conference room output list. With this, the print server can just print out the conference material to the attendees included in the corresponding output list, and does not have to search for the information of all attendees of the conference every time. Accordingly, it is possible to simplify the output process of the conference material, improving throughput.

Further, when the timing of the conference material output is set as the start time of the conference, the print server can make print request such that the printing would be completed prior to the conference start time. With this, it is possible to output the conference material without delaying the start of the conference. Further, in such a case, it is desirable not to output the conference material which includes confidential items. This is because there is a possibility of other conferences taking place in the same conference room prior to the conference of interest, in which case security becomes an issue. In particular, the print server can prohibit materials with access levels of, for example 2 or higher, from being outputted to a public printer.

Further, when the output timing of the conference material is specified as immediate or as the conference day in the attribute information of the attendee, and the output destination of the conference material is set as "not specified", the print server can switch the output of the material to the printer located in the conference room in consideration of security. This is a measure which takes into account security issues that arises from the fact that conference materials with "not specified" output destination are outputted through a public printer.

Further, when the output destination is an IP address, the print server also can print the conference material via the corresponding printer, and when the output destination is an E-mail address, it transmits an email attached with the conference material to the corresponding PC. The present multifunction system can flexibly accommodate the needs of the users, and is highly user-friendly.

Second Embodiment

Next, with reference to FIGS. 17 and 18, a second embodiment will be explained. The present embodiment scans in the original using the scanner 224 of the print server 100, and utilizes it as the conference material.

Figure 17:
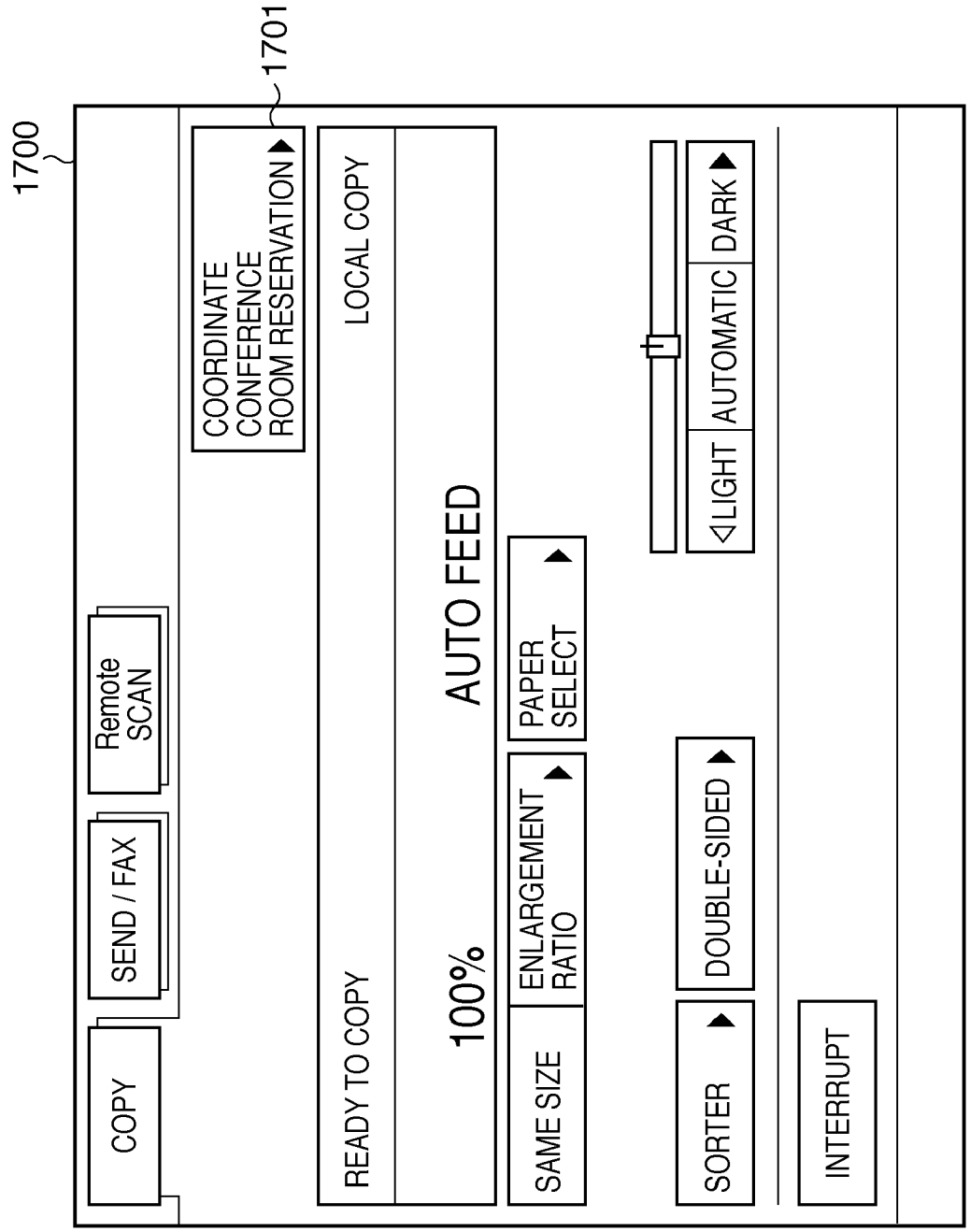
FIG. 17 is a diagram showing a screen 1700 displayed on the operating unit 300 of the print server 100 according to a second embodiment.

FIG. 17 is a diagram showing a screen 1700 displayed on the operating unit 300 of the print server 100 according to the second embodiment. FIG. 18 is a diagram showing a selection screen 1800 for selecting a conference room according to the second embodiment.

A screen 1700 indicates a default screen which is displayed on the operation unit 300 of the print server 100. The screen 1700 includes a button 1701 which is for performing reservation coordination of the conference room. When the button 1701 is pressed, a selection screen 1800 is displayed on the operation unit 300. The CPU 203 according to the present embodiment obtains reservation information regarding a plurality of conferences managed in the conference room reservation server 101, and displays the selection screen 1800 for selecting the plurality of conferences on the operations unit (display apparatus) 300 provided with the print server.

Figure 18:
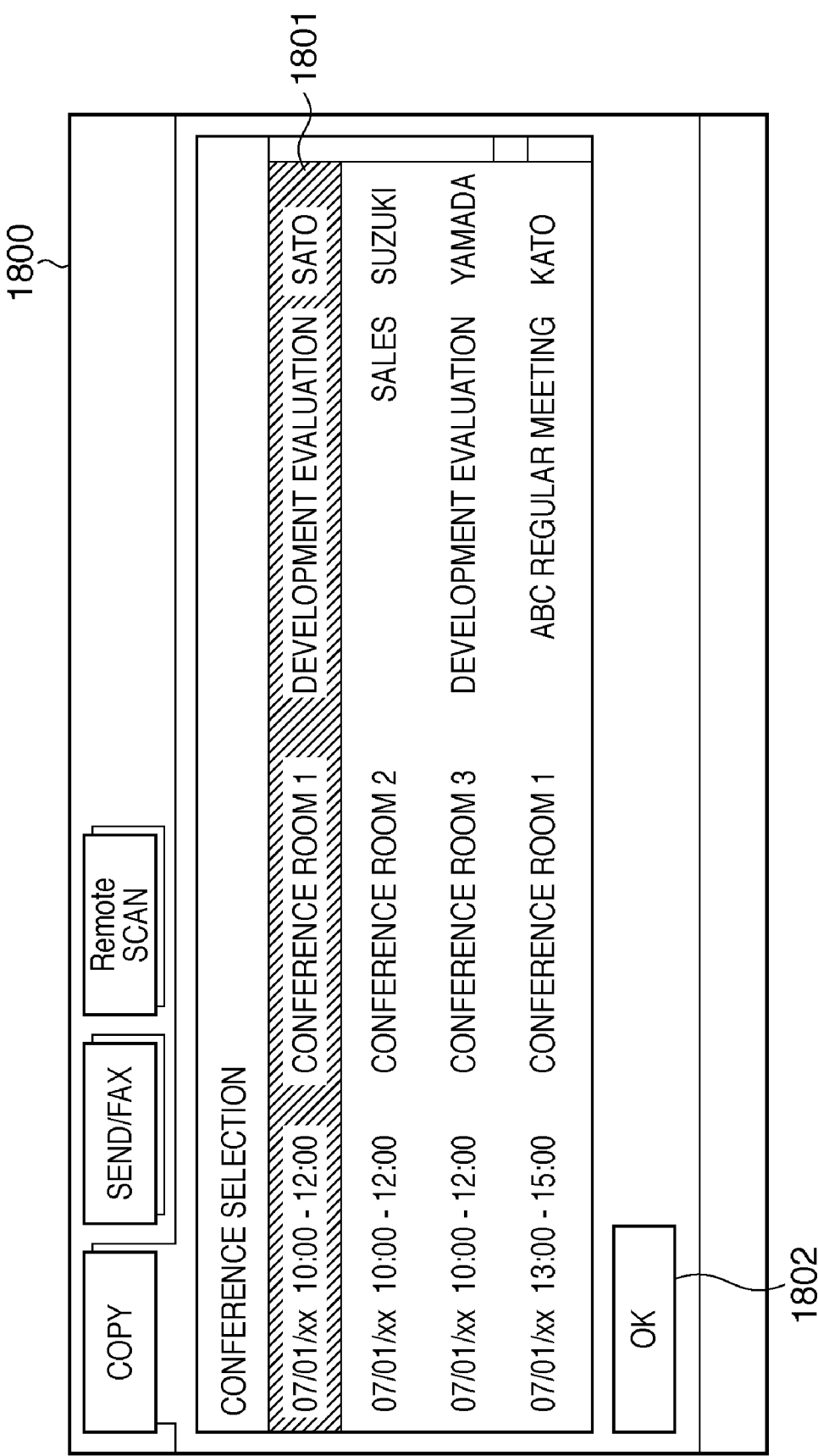
FIG. 18 is a diagram showing a selection screen 1800 for selecting a conference room according to the second embodiment.

As shown in FIG. 18, information regarding the plurality of conferences obtained from the conference room reservation server 101 is displayed on 1801 of the selection screen 1800. When the user selects one conference among the several displayed conferences and presses an OK button 1802, the conference material can be outputted. In particular, when the OK button is pressed, the CPU 203 makes the scanner 224 scan in the original set on the scanning unit as electronic data. Further, the CPU 203 stores the scanned electronic data as conference data in the HDD 209. The subsequent processes are identical to the first embodiment.

On the operation unit 300, it is desirable to display an input screen for inputting the access level of the scanned conference material. Further, when using the print server 100, it is also possible to read the ID of the operator with a required card, and have only the conferences attended by the operator displayed on the selection screen 1800. With this, it is possible to improve security and also allow selection which is easy for the operator.

As explained above, the print server 100 according to the present invention registers the electronic data scanned in and generated using an original as the conference material data. With this, the multifunction system 10 can have, as the conference material, electronic data composed using a certain application, or materials recorded on paper. As discussed, the present multifunction system can flexibly accommodate the needs of the conference organizer, and can be said as a convenient conference system.

The present invention provides a multifunction system and a control method thereof which enables output of conference materials of appropriate content at an appropriate timing and in an appropriate location, without making the conference organizer worry about the needs and rank of conference attendees.

While the present invention has been described with reference exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-237263 filed on Sep. 12, 2007, which is hereby incorporated by reference herein in its entirety.

What is claimed is:

1. A multifunction system comprising a member management server which manages attribute information of members, a conference room reservation server which manages reservation information of conferences room, a plurality of image printing apparatuses which prints conference materials to be used in a reserved conference, a plurality of information processing apparatuses which performs reservation of conferences, and a print server which manages output of the conference materials to said image printing apparatuses or said information processing apparatuses, each of said apparatuses being connected via a network, wherein:

said member management server comprises,
 a first transmission unit adapted to transmit information of a member registration screen for registering members, which is to be displayed on a display apparatus provided in said information processing apparatus, to said information processing apparatus via said network upon receiving a request for registration or modification of a member from said information processing device, and
 an attribute information storage unit adapted to acquire from said information processing apparatus and store said attribute information including at least identification information, member access level, output destination information of the conference material, and output timing of the conference material for each member registered through said member registration screen;

said conference room reservation server comprises,
 a second transmission unit adapted to transmit information of a conference registration screen for registering a conference, to be displayed on a display apparatus provided in said information processing apparatus, to said information processing apparatus via said network upon receiving a request for registration or modification of a conference from said information processing apparatus,
 a reservation information storage unit adapted to acquire from said information processing apparatus and store reservation information including at least time and date of conference, said identification information of attendees, conference material data, and access level of conference data, and
 a third transmission unit adapted to transmit said acquired reservation information to said print server via said network; and said print server comprises,
 a reception unit adapted to receive said reservation information transmitted from said conference room reservation server,
 a material data storage unit adapted to store data of said conference material included in said received reservation information,
 an acquiring unit adapted to acquire said attribute information of members corresponding to the identification information of the attendees from said member management server via said network, using said identification information of attendees included in said reservation information as a search keyword,
 a material selection unit adapted to select conference material to be printed for each attendee, by comparing said member access level included in said acquired attribute information and said conference material access level, and
 an output unit adapted to read out the selected conference material data from said material data storage unit and output said conference material to an apparatus indicated by the output destination of said conference material at a time indicated by the output timing of said conference material.

2. The multifunction system according to claim 1 wherein:
said print server further comprises a list composition unit adapted to compose output lists classified by the output timing of said conference material which includes at least output destination of said conference material for members corresponding to said attendees, access levels of said attendees, number of copies of said conference material to be output, and information regarding output status which indicates whether the output of said conference material is completed or not; and
said output unit outputs said conference material according to each output timing corresponding to each said output list.

3. The multifunction system according to claim 2 wherein said output timing of said conference material includes a first division to be outputted immediately when said output list is composed, a second division to be outputted on the day of the reserved conference, and a third division to be outputted in accordance with the conference start time at an image printing apparatus located in a conference room of the reserved conference.

4. The multifunction system according to claim 3 wherein said output unit is adapted to initiate printing ahead of time such that printing will be completed by start time of reserved conferences at said image printing apparatus located in the conference room, when said third division is set as the output timing of said conference material.

5. The multifunction system according to claim 3 wherein said list composition unit is adapted to add an output list composed as said third division for those attendees having attribute information which sets the output timing of said conference material as said first or second division and does not have a specified output destination.

6. The multifunction system according to claim 1 wherein:
the output destination of said conference material includes information indicating either an IP address of said image printing apparatus, or an E-mail address of said information processing apparatus; and
said output unit transmits data of said conference material to said corresponding image printing apparatus and also notifies a printing request when said IP address is set as the output destination of said conference material, and transmits an E-mail attached with the data of said conference material to the information processing apparatus when the output destination of said conference material is set as said E-mail address.

7. The multifunction system according to claim 1, wherein said print server further comprises:
 a scanning unit adapted to scan in an original as electronic data,
 a display unit adapted to display a selection screen for selecting said plurality of conferences on a display apparatus provided in said print server, by acquiring the reservation information for said plurality of conference which managed by said conference room reservation server, and a registration unit adapted to register said scanned electronic data as said reservation information, as the conference material of the conference selected via said selection screen using an input apparatus provided in said print server.

8. The multifunction system according to claim 1 wherein said output unit performs output of said conference material, every time the attribute information of members attending the reserved conference or the reservation information of said conference is modified, based on the modified information.

9. A control method of a multifunction system comprising a member management server which manages attribute information of members, a conference room reservation server which manages reservation information of conferences room, a plurality of image printing apparatuses which prints conference materials to be used in a reserved conference, a plurality of information processing apparatuses which performs reservation of conferences, and a print server which manages output of the conference materials to said image printing apparatuses or said information processing apparatuses, each of said apparatuses being connected via a network, wherein:

said member management server performs the steps of,
   transmitting information of a member registration screen for registering members, which is to be displayed on a display apparatus provided in said information processing apparatus, to said information processing apparatus via said network upon receiving a request for registration or modification of a member from said information processing device, and
   acquiring, from said information processing apparatus, and storing said attribute information including at least identification information, member access level, output destination information of the conference material, and output timing of the conference material for each member registered through said member registration screen;

said conference room reservation server performs the steps of,
   transmitting information of a conference registration screen for registering a conference, to be displayed on a display apparatus provided in said information processing apparatus, to said information processing apparatus via said network upon receiving a request for registration or modification of a conference from said information processing apparatus,
   acquiring, from said information processing apparatus, and storing reservation information including at least time and date of conference, said identification information of attendees, conference material data, and access level of conference data, and
   transmitting said acquired reservation information to said print server via said network; and said print server performs the steps of,
   receiving said reservation information transmitted from said conference room reservation server,
   storing data of said conference material included in said received reservation information,
   acquiring said attribute information of members corresponding to the identification information of the attendees from said member management server via said network, using said identification information of attendees included in said reservation information as a search keyword,
   selecting conference material to be printed for each attendee, by comparing said member access level included in said acquired attribute information and said conference material access level, and
   reading out the selected conference material data from said material data storage unit and outputting said conference material to an apparatus indicated by the output destination of said conference material at a time indicated by the output timing of said conference material.

\* \* \* \* \*